United States Patent [19]

Carlson et al.

[11] Patent Number: 5,334,655
[45] Date of Patent: Aug. 2, 1994

[54] METHOD FOR REDUCING MICROFOAM IN A SPRAY-APPLIED WATERBORNE COMPOSITION

[75] Inventors: Virginia A. Carlson, North Wales; Maria E. Curry-Nkansah, Lansdale; Matthew S. Gebhard, New Britain; Rosemarie P. Lauer, Chalfont, all of Pa.

[73] Assignee: Rohm and Haas Company, Philadelphia, Pa.

[21] Appl. No.: 164,603

[22] Filed: Dec. 9, 1993

[51] Int. Cl.$^5$ .............................................. C08G 18/14
[52] U.S. Cl. ...................................... 524/804; 524/808; 524/812; 524/817; 524/819; 524/827; 524/832; 524/833; 521/65; 521/78
[58] Field of Search ............... 524/804, 808, 812, 817, 524/819, 827, 832, 833; 521/65, 78

[56] References Cited

U.S. PATENT DOCUMENTS

| | | | |
|---|---|---|---|
| 4,325,856 | 4/1982 | Ishikawa et al. | 523/201 |
| 4,385,152 | 5/1983 | Boyack et al. | 524/460 |
| 4,567,099 | 1/1986 | Van Gilder et al. | 428/327 |
| 4,654,397 | 3/1987 | Mueller-Mall et al. | 524/460 |
| 4,749,616 | 6/1988 | Liu et al. | 524/276 |
| 4,814,373 | 3/1989 | Frankel et al. | 524/460 |
| 5,021,469 | 6/1991 | Langerbeins et al. | 523/201 |
| 5,185,396 | 2/1993 | Biale | 524/820 |

FOREIGN PATENT DOCUMENTS

| | | |
|---|---|---|
| 466409 | 1/1992 | European Pat. Off. . |
| 551942 | 6/1993 | European Pat. Off. . |
| 1619263 | 1/1971 | Fed. Rep. of Germany . |

*Primary Examiner*—Maurice J. Welsh
*Attorney, Agent, or Firm*—Ronald D. Bakule

[57] ABSTRACT

A method for reducing the amount of microfoam in a spray-applied clear waterborne polymeric composition is provided, wherein the clear composition contains certain emulsion-polymerized addition polymers or certain multi-staged emulsion-polymerized addition polymers is formed; is spray-applied to a substrate; and is dried. Also provided are substrates bearing such spray-applied clear compositions.

17 Claims, No Drawings

METHOD FOR REDUCING MICROFOAM IN A SPRAY-APPLIED WATERBORNE COMPOSITION

FIELD OF THE INVENTION

This invention relates to a method for reducing the amount of microfoam in a spray-applied clear waterborne polymeric composition.

BACKGROUND OF THE INVENTION

Waterborne polymeric compositions such as clear or pigmented coatings are frequently applied to substrates by spraying techniques. Some of the common spraying techniques used are, for example, air spray, airless spray, air-assisted airless spray, disc and bell spray, and high volume low pressure spray. In air spray compressed air is critical to atomize the waterborne polymeric composition and to assist in conveying the droplets to the substrate. In airless, disc, and bell spray techniques the waterborne polymeric composition is atomized by mechanical means and the droplets are suspended in air on formation. Air-assisted airless spray is a hybrid of the two spray methods described above wherein air is used to convey the droplets which are formed mechanically; and high volume low pressure spray is another commonly recognized variant of air spray.

Waterborne compositions containing water-soluble or water-insoluble polymers frequently contain microfoam after they are applied to substrates by various spraying techniques. Microfoam remaining in a dried film formed from the spray-applied aqueous composition may detract from the appearance of the film, particularly from the appearance of a clear, or unpigmented, film which film may appear to be hazy.

DESCRIPTION OF THE PRIOR ART

U.S. Patent No. 4,749,616 discloses a heat-sealable coating composition containing an interpolymer which may be spray-applied as an essentially unpigmented composition, wherein the average particle size of the interpolymer component is from about 0.03 to about 0.5 microns.

U.S. Patent No. 5,021,469 discloses a multiphase emulsion polymer wherein the emulsion polymer particles have an average diameter of less than 200 nanometers and a gloss paint formed therefrom, which may be applied by spray coating.

U.S. Patent No. 5,185,396 discloses a polymeric emulsion which may be used as a binder for a water-based varnish wherein the particles of the polymeric emulsion are less than about 250 nanometers.

German Patent Application DE 1619263 discloses a latex for coating needled carpets with synthetic fabric backing. The styrene/butadiene latex polymer with a weighted average particle diameter of 0.16 to 0.3 microns avoids the formation of bubbles in the coating during drying.

None of the references discloses a method for reducing the amount of microfoam in a spray-applied clear waterborne composition.

SUMMARY OF THE INVENTION

A method for reducing the amount of microfoam in a spray-applied clear waterborne polymeric composition is provided, wherein the composition contains a certain emulsion-polymerized addition polymer.

DETAILED DESCRIPTION OF THE INVENTION

According to a first aspect of the present invention there is provided a method for reducing the amount of microfoam in a spray-applied clear waterborne polymeric composition: first, forming the composition which contains an emulsion-polymerized addition polymer with a GPC weight average molecular weight of less than about 75,000; then, applying the clear composition to a substrate using a spray method; and drying the clear composition.

According to a second aspect of the present invention there is provided a method for reducing the amount of microfoam in a spray-applied clear waterborne polymeric composition: first, forming the composition which contains multi-staged emulsion-polymerized addition polymer particles, the particles having an inner phase and an outer phase, wherein the outer phase has a GPC weight average molecular weight of less than about 200,000; then, applying the clear composition to a substrate using a spray method; and drying the clear composition.

According to a third aspect of the present invention there is provided a method for reducing the amount of microfoam in a spray-applied clear waterborne polymeric composition: first, forming the composition which contains multi-staged emulsion-polymerized addition polymer particles, the particles having an inner phase and an outer phase, the particles having an average particle diameter from about 130 nanometers to about 250 nanometers; then, applying the clear composition to a substrate using a spray method; and drying the clear composition.

According to a fourth aspect of the present invention there is provided a substrate bearing a spray-applied clear waterborne polymeric composition with a reduced amount of microfoam.

A "waterborne polymeric composition " herein is defined as a composition containing an emulsion-polymerized water-insoluble addition polymer. The waterborne polymeric composition may contain water or a mixture of water and at least one water-miscible solvent such as, for example, isopropanol, ethylene glycol butyl ether, and propylene glycol propyl ether.

The emulsion-polymerized addition polymer in the clear waterborne polymeric composition may be prepared by the addition polymerization of at least one ethylenically unsaturated monomer such as, for example, acrylic ester monomers including methyl acrylate, ethyl acrylate, butyl acrylate, 2-ethylhexyl acrylate, decyl acrylate, methyl methacrylate, butyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; vinyl monomers such as vinyl chloride, vinylidene chloride, N-vinyl pyrollidone; and acrylonitrile or methacrylonitrile. Low levels of copolymerized ethylenically-unsaturated acid monomers such as, for example, 0.1%-7%, by weight based on the weight of the emulsion-polymerized polymer, acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride may be used.

The emulsion-polymerized polymer used in this invention is a substantially thermoplastic, or substantially uncrosslinked, polymer when it is applied to the substrate, although low levels of deliberate or adventitious crosslinking may be present. When low levels of pre-crosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,4-butylene glycol dimethacrylate, 1,6-hexanedioldiacrylate, and the like, may be used. It is important, however, that the quality of the film formation is not materially impaired.

The glass transition temperature of the emulsion-polymerized polymer is from about 5 C. to about 85 C., as measured by differential scanning calorimetry (DSC). The emulsion polymer samples were dried, preheated to 120 C., rapidly cooled to −100 C., and then heated to 150 C. at a rate of 20 C./minute while data was being collected. The Tg was measured at the midpoint using the half-height method.

The emulsion polymerization techniques used to prepare such dispersions are well known in the art. Conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels.

Chain transfer agents such as, for example, mercaptans are typically used in an amount effective to provide a GPC weight average molecular weight of less than about 75,000. "GPC weight average molecular weight", as used herein, is defined as the weight average molecular weight determined by high volume gel permeation chromatography (GPC) measured on a THF solution of polymer. The detailed proceedure is presented herein in the examples.

The particle size of the emulsion-polymerized polymer may be from about 40 nanometers to about 1000 nanometers in diameter. Preferred is a particle diameter from about 130 nanometers to about 250 nanometers. Particle diameters less than about 130 nanometers yield spray-applied clear films with greater amounts of microfoam while particle diameters greater than about 250 nanometers yield spray-applied clear films with a hazy appearance. Particle size as determined herein is presented in the examples.

In another aspect of the present invention the polymeric composition is prepared by a multistage emulsion addition polymerization process, in which at least two stages differing in composition are formed in sequential fashion. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique.

Polymeric particles formed by multistage emulsion addition polymerization process are composed of two or more phases of various geometries such as, for example, core/shell or core/sheath particles, core/shell particles with shell phases incompletely encapsulating the core, core/shell particles with a multiplicity of cores, interpenetrating network particles, and the like. In all of these cases the majority of the surface area of the particle will be occupied by at least one outer phase and the interior of the particle will be occupied by at least one inner phase.

Preferred is a two-staged emulsion-polymerized addition polymer particle with an outer phase containing from about 20% to about 80%, by weight based on the total weight of the particle. Preferred is a two-staged emulsion-polymerized addition polymer particle with an outer phase having a glass transition temperature (Tg), as determined by DSC, which is at least about 30 C. lower than the Tg of the inner phase. Preferred is a multi-staged emulsion-polymerized addition polymer particle with a particle diameter from about 130 nanometers to about 250 nanometers. Preferred is a multi-staged emulsion-polymerized addition polymer particle with an outer phase polymer which has a GPC weight average molecular weight less than about 200,000. More preferred is a multi-staged emulsion-polymerized addition polymer particle with a particle diameter from about 130 nanometers to about 250 nanometers and with an outer phase polymer which has a GPC weight average molecular weight less than about 200,000.

Each of the stages of the multi-staged emulsion-polymerized polymer may contain the same monomers, chain transfer agents, etc. as disclosed herein-above for the emulsion-polymerized addition polymer. The emulsion polymerization techniques used to prepare such dispersions are well known in the art such as, for example, as are disclosed in U.S. Pat. Nos. 4,325,856; 4,654,397; and 4,814,373; hereby incorporated herein by reference.

An additional embodiment of this invention is a clear composition which contains, in addition to either the emulsion-polymerized addition polymer or the multi-staged emulsion-polymerized addition polymer from about 5% to about 50%, by dry weight based on dry weight of the addition polymer, of an additional emulsion-polymerized polymer having an average particle diameter less than about 0.5 times the diameter of the addition polymer particles. Preferred is from about 10% to about 20% by dry weight based on dry weight of the addition polymer, of an additional emulsion-polymerized polymer having an average particle diameter less than about 0.5 times the diameter of the addition polymer particles.

The solids content of the waterborne polymeric composition may be about 20% to about 70% by weight. The viscosity of the waterborne polymeric composition may be from about 50 centipoises to about 10,000 centipoises, as measured using a Brookfield viscometer (Model LVT using spindle #3 at 12 rpm); the viscosities appropriate for different spraying methods vary considerably.

The clear waterborne polymeric composition contains no ingredients which cause substantial opacity in the dried coating at the applied dry film thickness, which is typically from about 0.1 rail to about 5 mils. The dried coating may be applied as one coat or as multiple coats, with or without drying between coats. The waterborne polymeric composition may contain, in addition to the emulsion-polymerized water-insoluble polymer, conventional components such as, for example, emulsifiers, substantially transparent pigments and fillers, dispersants, coalescing agents, curing agents, thickeners, humectants, wetting agents, biocides, plasticizers, antifoaming agents, colorants, waxes, and antioxidants. The spray-applied clear waterborne polymeric composition is applied to a substrate such as, for example, metal, wood, and plastic, using a spraying method. The composition may be applied to wood such as, for example, wood, sealed wood, particle board treated with a UV-cured filler, painted wood, and previously coated wood; or to metal such as, for example, metal, treated metal, metal coated with an electrodeposited primer, and previously painted metal; or to plastic such as, for example, plastic, plastic alloys, and reinforced plastic (such as RIM substrate). The spraying method may be, for example, air-assisted spray, airless spray, bell or disc spraying, high volume low pressure spray, and air-assisted electrostatic spray. In such spraying methods the waterborne polymeric composition is atomized, or formed into small droplets, which are conveyed to the substrate where the droplets form into a substantially continuous film. In such spray-applied methods the atomized droplets of the waterborne polymeric composition are formed in contact with and/or admixed with a gas-conventionally, air. The gas, under pressure, may be required to atomize the coating such as, for example, in conventional air spray applications; the gas may flow towards the substrate and provide for at least some of the conveying of the atomized composition such as, for example, in air-assisted airless spray application; or the gas may be the medium through which the atomized composition, atomized by mechanical action in the presence of the gas such as, for example, in airless spray, disc, and bell applications, with or without electrostatic assistance, moves to the substrate. Occlusions of gas, "microfoam", typically are found in the waterborne polymeric composition after its application to the substrate. The microfoam is undesirable; microfoam may cause haze or opacity in clear or substantially unpigmented coatings or films.

The clear composition may be dried at ambient temperature or at elevated temperatures. Preferred is a drying temperature from about 20 C. to about 250 C. "Microfoam" herein is defined as substantially spherical gas-filled occlusions in the dried film which are typically 10–20 micrometers in radius. The microfoam occlusions lack sufficient buoyancy to escape from the waterborne polymeric composition before they become substantially immobilized in the applied composition. The "amount of microfoam" as used herein is determined by counting the number of bubbles in a selected area of the applied waterborne composition, using an optical microscope under 70X magnification. The absolute amount of microfoam is influenced by spray equipment, spray conditions, and environmental conditions such as, for example, temperature, humidity, and air flow. The method for reducing microfoam of this invention relates to the reduction of the amount of microfoam observed in a spray-applied clear coating relative to the amount of microfoam observed in a comparative sample both prepared under the same conditions.

The following examples are intended to illustrate the method for reducing the amount of microfoam in a spray-applied waterborne polymeric composition. They are not intended to limit the invention as other applications of the invention will be obvious to those of ordinary skill in the art.

EXPERIMENTAL METHODS

Measurement of GPC Weight Average Molecular Weight

Samples for GPC molecular weight determination were prepared by dissolving 25 mg. of soluble polymer in distilled, reagent gradeTHF at a concentration of 2.5 mg./ml. by shaking for 24 hours. A sample volume of 0.1 ml. of the polymer system was injected onto a Type A (20 micron) gel column 60 cm. in length prepared by Polymer Laboratories; a flow rate of 0.6 ml./min. was used. The sampling rate was 2.5 points per min. Data acquisition was by a Hewlett-Packard HP-3852 computer. Molecular weight calibration was carried out before each sample using polymethyl methacrylate and data analysis was accomplished with a Hewlett-Packard HP-1000 computer running RTE-A.

Particle Size Determination

The particle diameter of the particles was determined using a Brookhaven BI-90 Particle Sizer which employs a light scattering technique. To measure the particle size a sample of 0.1 to 0.2 grams of as is aqueous dispersion was diluted to a total of 40 cc with distilled water. A 2 cc portion was delivered into an acrylic cell which was then capped. The particle size was measured for 1000 cycles. The measurement was repeated three times and the average of three values was reported.

EXAMPLE 1.

Preparation of clear waterborne polymeric compositions containing emulsion-polymerized addition polymers of various molecular weights.

Preparation of Samples 1–2 and Comparative A.

Preparation of emulsion-polymerized addition polymer for comparative sample A. To a 4-neck, 3-liter stirred reaction flask containing 722.1 g DI water and 62.4 g sodium alkylphenyl sulfonate (23% active) at 85° C., 25.6 g of the Feed 1 monomer emulsion rinsed with 17.5 g DI water, 1.82 g ammonium persulfate dissolved in 20 g of DI water, and 2.73 g sodium carbonate dissolved in 35 g of DI water were introduced in succession. After a ten minute delay, a gradual addition of Feed 1 and Feed 2 were begun and fed at a uniform rate over 3 hours until completion. Feed 1 was an emulsion of 277.4 g DI water, 7.33 g sodium alkylphenyl sulfonate(23% active), 462.4 g n-butyl methacrylate, 353.6 g methyl methacrylate, 45.3 g n-butyl acrylate, and 45.3 g methacrylic acid. Feed 2 was 0.46 g ammonium persulfate dissolved in 56 g DI water. A batch temperature of 85°±2° C. was maintained throughout the feed period. On completion of Feeds 1 and 2, the batch was held for an additional 30 minutes at 85°±2° C. before cooling. Two redox chasers were added at 65° C. The final reaction mixture was neutralized to pH=7.4 with 28% aqueous ammonia. The latex had a weight % solids content of 42.3, a Brookfield viscosity of 78 cps, and a particle size of 73 nanometers.

Preparation of emulsion-polymerized addition polymer for sample 1. This dispersion was prepared according to the method described in Example 1 with the exception that 4.54 g n-dodecyl mercaptan was added to the monomer emulsion (Feed 1) after removal of the initial kettle ME charge (25.6g). This dispersion had a final pH=7.4, a weight % solids of 41.4, a viscosity of 62 cps, and a particle size of 73 nanometers.

Preparation of emulsion-polymerized addition polymer for sample 2. This dispersion was prepared according to the procedure detailed in Example 1, except that the monomer emulsion (Feed 1) was modified with the addition of 9.1 g n-dodecyl mercaptan after the initial monomer emulsion kettle charge (25.6g) was removed. The final latex had a pH=7.2, a weight % solids of 41.4, a viscosity of 58 cps, and a particle size of 69 nanometers.

The emulsion-polymerized addition polymers described above were mixed with the ingredients listed in Table 1.1 added in the order shown.

TABLE 1.1

| Comp. Sample A | Sample 1 | Sample 2 |
|---|---|---|
| 200 g Polymer | 200 g. Polymer | 200 g. Polymer |
| 4.2 g TBEP | 4.2 g TBEP | 4.2 g TBEP |
| 4.1 g Butyl CARBITOL | 4.1 g Butyl CARBITOL | 4.1 g Butyl CARBITOL |
| 24.5 g Butyl CELLOSOLVE | 24.5 g Butyl CELLOSOLVE | 24.5 g Butyl CELLOSOLVE |
| 4.3 g EKTA-SOLVE EEH | 4.3 g EKTA-SOLVE EEH | 4.3 g EKTA-SOLVE EEH |
| 0.4 g 14% NH$_4$OH | 0.4 g 14% NH$_4$OH | 0.4 g 14% NH$_4$OH |
| 59.3 g Water | 27.0 g Water | 22.0 g Water |

CARBITOL and CELLOSOLVE are trademarks of the Union Carbide Corp. EKTASOLVE is a trademark of Eastman Chemical Products Corp. TBEP was tris(2-butoxyethyl) phosphate from Aldrich Chemical Co., Inc.

EXAMPLE 2.

Evaluation of spray-applied clear waterborne polymeric compositions.

Samples 1-2 and Comparative sample A were each spray applied over a stained cherry panel. A conventional suction-feed spray gun (DeVilbiss MBC) with an EX tip and a #30 air cap was used. The gas pressure was 45 psi. Each panel was sprayed with three coats of one of the samples. The panels were sprayed under the same temperature and humidity conditions (97° F./25%RH) and were dried in these conditions. The dried panels were evaluated for gloss (20°/60°/85°), and microfoam density (bubbles/mm$^2$). The results are given in Table 2.1 below. Also given in Table 2.1 is the M$_w$ for each of the emulsion polymers in this study. The gloss was measured with a Byk Labotron gloss unit, and the bubble density was determined by counting the bubbles using a microscope. M$_w$ was determined using high volume gel permeation chromatography.

TABLE 2.1

| | Evaluation of microfoam density | | | |
|---|---|---|---|---|
| Sample | Bubbles/mm | Gloss | % Solids | M$_w$(×1000) |
| Comp. A | 196 | 26/66/78 | 28.5 | 310 |
| 1 | 188 | 52/83/90 | 31.3 | 103 |
| 2 | 20 | 69/85/90 | 31.9 | 45 |

Samples 1-2 of this invention exhibit superior gloss and microfoam density when compared to Comparative sample A.

EXAMPLE 3.

Preparation of clear waterborne polymeric compositions containing emulsion-polymerized addition polymers of various particle sizes.

Preparation of Samples 3-9.

Preparation of emulsion-polymerized addition polymer for sample 3. In a 5-liter, 4-neck stirred reaction flask, 1444.3 g of DI water and 124.9 g sodium alkylphenyl sulfonate (23% active) was heated to 85° C. 51.3 g of Feed 1 was added to the kettle, followed by the addition of 3.63 g ammonium persulfate dissolved in 40 g DI water and 5.46 g sodium carbonate dissolved in 70 g DI water. Five minutes later, a gradual addition of Feed 1 and Feed 2 were started at a uniform rate and fed to completion over three hours. Feed 1 was an emulsion consisting of 554.9 g DI water, 14.52 g sodium alkylphenyl sulfonate (23% active), 924.7 g butyl methacrylate, 493.2 g methyl methacrylate, 331.8 g butyl acrylate, and 63.5 g methacrylic acid. Feed 2 consisted of 0.91 g ammonium persulfate dissolved in 111 g DI water. The batch was held at 85°±2° C. throughout the duration of the feeds. On completion of the gradual additions, the batch was held for an additional 30 minutes at 85° C. and then cooled to 65° C. Two redox chasers were added. The product was neutralized to pH=7.6 with 28% aqueous ammonia and had a final weight % solids of 41.0, a Brookfield viscosity of 57 cps, and a particle size of 74 nanometers.

Preparation of emulsion-polymerized addition polymer for sample 4. A 4-neck, 5-liter stirred reaction flask containing 1514 g DI water and 55.17 g sodium alkyl phenyl sulfonate (23% active) was heated to 85° C. 51.3 g of the Feed 1 monomer emulsion, 3.63 g ammonium persulfate dissolved in 40 g DI water, and 5.46 g sodium carbonate dissolved in 70 g DI water were charged sequentially. After a 5 minute hold period, a gradual addition of both Feed 1 and Feed 2 was started and fed to completion at a uniform feed rate over 3 hours. Feed 1 was an emulsion consisting of 485.2 g DI water, 85.2 g sodium alkylphenyl sulfonate (23% active), 924.7 g butyl methacrylate, 493.2 g methyl methacrylate, 331.8 g butyl acrylate, and 63.5 g methacrylic acid. Feed 2 consisted of 0.91 g ammonium persulfate dissolved in 111 g DI water. A batch temperature of 85°±2° C. was maintained throughout the gradual addition feed period. On completion of the feeds, the batch was held at 85°±2° C. for 30 minutes before cooling to 65° C. At 65° C., two redox chasers were added. The batch was neutralized to pH=7.9 with 28% aqueous ammonia. The product had a final weight % solids of 41.1, a Brookfield viscosity of 31 cps, and a particle size of 92 nanometers.

Preparation of emulsion-polymerized addition polymers for samples 5-9. The addition polymers were prepared according to the procedure given in preparation of emulsion-polymerized addition polymer for sample 4 herein-above with the exception that the kettle water, surfactant, and Feed 1 monomer emulsion charges were as specified in Table 3.1 along with the characterization of each of the emulsion polymers.

TABLE 3.1

| Polymer for: | Sample 5 | Sample 6 | Sample 7 | Sample 8 | Sample 9 |
|---|---|---|---|---|---|
| Initial Kettle Charges | | | | | |
| surfactant(1) | 35.5 | 15.8 | 11.8 | 5.9 | 4.0 |

TABLE 3.1-continued

| Polymer for: | Sample 5 | Sample 6 | Sample 7 | Sample 8 | Sample 9 |
|---|---|---|---|---|---|
| DI Water | 1514 | 1514 | 1514 | 1514 | 1514 |
| Feed 1 (Monomer Emulsion) | | | | | |
| DI Water | 485.2 | 485.2 | 485.2 | 485.2 | 485.2 |
| surfactant(1) | 84.2 | 84.2 | 88.2 | 94.1 | 96.0 |
| BMA | 924.7 | 924.7 | 924.7 | 924.7 | 924.7 |
| MMA | 493.2 | 493.2 | 493.2 | 493.2 | 493.2 |
| BA | 331.2 | 331.8 | 331.2 | 331.8 | 331.8 |
| MAA | 63.5 | 63.5 | 63.5 | 63.5 | 63.5 |
| % Total Solids | 41.3 | 41.2 | 41.6 | 41.4 | 41.5 |
| pH | 7.5 | 7.7 | 7.9 | 8.0 | 8.1 |
| Visc, cps | 20 | 14 | 18 | 20 | 18 |
| Part. Size, nm | 107 | 128 | 140 | 168 | 200 |

(1)surfactant = sodium alkylphenyl sulfonate (23% active)

Under good agitation, the pH of each emulsion polymer of this example was raised to 8.5 with 14% NH3. The coalescent, a premixture of 3 parts Butyl CELLOSOLVE/1 part butyl CARBITOL, by weight, was added to the well-stirred emulsion polymer. The formulated sample was aged for 18 hours.

A nonionic urethane thickener, ACRYSOL RM-825 (Acrysol is a trademark of Rohm and Haas Co.) was added in an amount sufficient to raise the viscosity to a range of 20–23 seconds (#2 Zahn cup).The specific quantities of emulsion polymer, coalescent, and associative thickener for each sample are listed in Table 4.1.

TABLE 4.1

Preparation of samples 3–9

| Sample | % Solids in neat latex | g resin | Coalescent (grams) | Thickener (grams) | Viscosity #2 Zahn |
|---|---|---|---|---|---|
| 3 | 41.0 | 150.0 | 15.4 | 0.00 | 22 |
| 4 | 41.1 | 150.0 | 15.4 | 0.66 | 21 |
| 5 | 41.3 | 158.0 | 16.4 | 1.30 | 22 |
| 6 | 41.2 | 150.0 | 15.5 | 1.31 | 20 |
| 7 | 41.6 | 150.0 | 15.6 | 2.19 | 20 |
| 8 | 41.4 | 150.0 | 15.5 | 2.47 | 20 |
| 9 | 41.5 | 150.0 | 15.6 | 2.44 | 20 |

EXAMPLE 4.

Evaluation of microfoam using emulsion-polymerized polymers of various particle sizes.

Samples 3–9 were spray-applied (one coat over black glass, ≈4.5 mils wet) at 85° F., 20% relative humidity. The panels were allowed to dry under the same conditions. The bubble concentration was measured using an optical microscope.

TABLE 4.2

Determination of microfoam in spray-applied samples

| Sample | Particle size (nm) | bubbles/mm2 |
|---|---|---|
| 3 | 74 | 80 |
| 4 | 92 | 11 |
| 5 | 107 | 13 |
| 6 | 128 | 74 |
| 7 | 140 | 0 |
| 8 | 168 | 0 |
| 9 | 200 | 0 |

Samples 3–9 exhibit reduced microfoam spray-applied clear waterborne compositions containing an emulsion-polymerized polymer having a particle size greater than about 130 nanometers.

EXAMPLE 5.

Preparation of waterborne polymeric composition Preparation of Sample 10 and Comparative Sample B.

Preparation of emulsion-polymerized addition polymer for sample 10. A 4-neck, 5-liter stirred reaction flask containing 1514 g DI water and 7.87 g sodium alkyl phenyl sulfonate (23% active) was heated to 85° C. 51.3 g of a monomer emulsion consisting of 485.2 g DI water, 91.2 g sodium alkylphenyl sulfonate (23% active), 924.7 g butyl methacrylate, 493.2 g methyl methacrylate, 331.8 g butyl acrylate, and 63.5 g methacrylic acid followed by a rinse of 35 g. DI water, 3.63 g ammonium persulfate dissolved in 40 g DI water, and 5.46 g sodium carbonate dissolved in 70 g DI water were charged sequentially. After a 5 minute hold period, a gradual addition of both the remaining monomer emulsion to which 18.2 g. n-dodecyl mercaptan had been added and a solution of 0.91 g. ammonium persulfate dissolved in 111 g. DI water was started and fed to completion at a uniform feed rate over 3 hours. A batch temperature of 85°–86° C. was maintained throughout the gradual addition feed period. On completion of the feeds, the batch was held at 85° C. for 30 minutes before cooling to 65° C. At 65° C., two redox chasers were added. The batch was neutralized with 11.7 g. 28% aqueous ammonia, a biocide was added, and the batch was diluted with 108.5 g. DI water and filtered. The product had a final weight % solids of 41.6, a Brookfield viscosity of 20 cps, pH=7.99, and a particle size of 159 nanometers. The GPC weight average molecular weight was 50,000.

Preparation of emulsion-polymerized addition polymer for comparative sample B. In a 5-liter, 4-neck stirred reaction flask, 1444.3 g of DI water and 124.9 g sodium alkylphenyl sulfonate (23% active) were heated to 85° C. A monomer preform seed charge consisting of 51.3 g of Feed 1 was added to the kettle, followed by the addition of 3.63 g ammonium persulfate dissolved in 40 g DI water and 5.46 g sodium carbonate dissolved in 70 g DI water. Five minutes later, a gradual addition of Feed 1 and Feed 2 were started at a uniform rate and fed to completion over three hours. Feed 1 was an emulsion consisting of 554.9 g DI water, 14.52 g sodium alkylphenyl sulfonate (23% active), 924.7 g butyl methacrylate, 493.2 g methyl methacrylate, 331.8 g butyl acrylate, and 63.5 g methacrylic acid. Feed 2 consisted of 0.91 g ammonium persulfate dissolved in 111 g DI water. The batch was held at 85°±2° C. throughout the duration of the feeds. On completion of the gradual additions, the batch was held for an additional 30 minutes at 85° C. and then cooled to 65° C. Two redox chasers were added. The product was neutralized to pH=7.6 with 28% aqueous ammonia and had a final weight % solids of 41.0, a Brookfield viscosity of 57 cps, and a particle size of 74 nanometers.

The emulsion-polymerized addition polymers described above were mixed with the ingredients listed below, added in the order shown.

| Comparative Sample B | Sample 10 |
|---|---|
| 200 g emulsion polymer | 200 g emulsion polymer |
| 15.4 g EKTASOLVE EB | 15.6 g EKTASOLVE EB |
| 5.1 g EKTASOLVE DB | 4.2 g EKTASOLVE DB |
| | 2.9 g deionized H2O |
| | 2.22 g ACRYSOL RM 825 |
| final % solids = 37% | final % solids = 37% |

-continued

| Comparative Sample B | Sample 10 |
|---|---|
| final visc. = 23 sec. #2 Zahn | final visc. = 21 sec. #2 Zahn |

EXAMPLE 6.

Evaluation of microfoam in spray-applied waterborne polymeric composition

One coat of sample 10 and comparative sample B were each air-sprayed over various substrates at 94° F. and 39% R.H. The bubble density was evaluated using a 70X microscope and the number of bubbles/mm2 was counted in the dried film. The results are presented in Table 6.1

TABLE 6.1

| | | Microfoam measurement | | | |
|---|---|---|---|---|---|
| | | Bubbles/mm2 (various substrates) | | | |
| Sample | Particle Size | Glass | Paper | Metal | Plastic |
| 10 | 159 | 0 | 0 | 0 | 0 |
| Comp. B | 74 | 28 | 17 | 6 | 20 |

Waterborne polymeric composition sample 10 of this invention spray-applied to various substrates exhibits superior, lower levels of microfoam compared to comparative sample B.

EXAMPLE 7.

Preparation of waterborne polymeric compositions containing multi-stage emulsion-polymerized addition polymer at various particle sizes Preparation of Sample 11–12 and Comparative Sample C Preparation of multi-staged emulsion-polymerized addition polymer for sample 11. A 4-neck, 5-liter, round-bottom stirred reaction flask containing 1085 g DI water and 1.33 g of a 58% ammonium alkylphenoxypolyethyleneoxy sulfate surfactant was heated to 85° C. To the kettle, 3 g sodium carbonate dissolved in 75 g DI water and 4 g ammonium persulfate dissolved in 20 g DI water were added in order. The batch temperature was adjusted to 85° C. after which a gradual addition of Stage #1 ME was initiated at a uniform rate and fed to completion to the kettle over 112 minutes. Simultaneously, the Cofeed Initiator was started at a rate of 5.7 g/10 minutes. The batch temperature was maintained at 85°±2° C. over the stage 1 feed period. On completion of the addition of Feed #1, the Cofeed Initiator feed was interrupted and the batch was held at 85°±2° C. for 30 minutes. After the hold period, the addition of the Stage #2 ME was started and the Cofeed Initiator addition was resumed. The Stage #2 ME was fed to the kettle over 68 minutes while maintaining a batch temperature of 85°±2° C. When all feeds were completed, the batch was held at temperature for 30 minutes. The reaction was then cooled to 65° C. Two redox chasers were added. The batch was neutralized with ammonia and a biocide was added. The Stage #1 ME consisted of an emulsion of 272.9 g DI water, 12.34 g of a 58% active solution of ammonium alkylphenoxypolyethyleneoxysulfate surfactant, 640.7 g butyl acrylate, 275.94 g methyl methacrylate, and 38.2 g methacrylic acid. The Stage #2 ME consisted of an emulsion of 272.9 g DI water, 7.57 g of ammonium alkylphenoxy-polyethyleneoxy sulfate surfactant (58% active solution), 510.9 g methyl methacrylate, and 11.7 g methacrylic acid. The Cofeed Initiator was composed of 2 g ammonium persulfate dissolved in 100 g DI water. The product had a final weight % solids of 44.8, a pH=8.1, a Brookfield viscosity of 52 cps, and a particle size by Brookhaven BI-90 of 163 nm.

Preparation of multi-staged emulsion-polymerized addition polymer for sample 12. The method of the preparation of multi-staged emulsion-polymerized addition polymer for sample 11 was repeated with the following changes: 0.53 g of 58% surfactant solution was charged to the reactor. Stage 1 ME was stabilized with 12.8 g of the surfactant solution and the Stage 2 ME contained 7.9 g Of the surfactant solution. The product had a final weight % solids of 44.3, a pH of 7.9, a viscosity of 33 cps, and a particle size of 249 nm.

Preparation of multi-staged emulsion-polymerized addition polymer for comparative sample C. The method of the preparation of multi-staged emulsion-polymerized addition polymer for sample 11 was repeated with the following changes: 42.48 g of ammonium alkylphenoxypolyethyleneoxy sulfate (58% active) was charged to the reactor. Stage 1 was emulsified with 6.59 g and Stage 2 with 4.03 g of 58% surfactant. The product had a final weight % solids of 44.39, a pH=7.5, a Brookfield viscosity of 250 cps, and a final particle size of 77 nm (Brookhaven BI-90).

The emulsion-polymerized addition polymers described above were mixed with the ingredients listed below added in the order shown.

| Comparative sample C | Sample 11 |
|---|---|
| 200 g emulsion polymer | 200 g emulsion polymer |
| 12.8 g EKTASOLVE EB | 12.8 g EKTASOLVE EB |
| 4.3 g EKTASOLVE DB | 4.3 g EKTASOLVE DB |
| 8.0 g deionized H2O | 9.8 g deionized H2O |
| | 0.17 g ACRYSOL RM 825 |
| final % solids = 39% | final % solids = 39% |
| final visc. = 26 sec. #2 Zahn | final visc. = 22 sec. #2 Zahn |

| Sample 12 |
|---|
| 50 g emulsion polymer |
| 14% NH3 added to pH 8.5 |
| 3.2 g EKTASOLVE EB |
| 1.1 g EKTASOLVE DB |

EXAMPLE 8.

Evaluation of waterborne polymeric compositions containing multi-stage emulsion-polymerized addition polymer at various particle sizes One coat of each of sample 11 and comparative sample C were air-sprayed over black glass The bubble density was evaluated using a 70X microscope and the bubbles/mm2 were counted in the dried film. The results are given in Table 8.1.

TABLE 8.1

| | | Microfoam evaluation | |
|---|---|---|---|
| | | Bubbles/mm2 | |
| Sample | Particle Size (nm.) | 94° F. 39% RH | 96° F. 34% RH |
| 11 | 163 | 17 | 11 |
| Comp. C | 67 | 77 | 105 |

Waterborne polymeric composition sample 11 of this invention exhibited lower amount of microfoam, i.e., superior performance, when compared to comparative sample C.

A film of samples 11–12 and comparative sample C were drawn down over black glass using a 5 mil draw down bar. Gloss readings were made using a Byk Labotron gloss unit at 20°, 60° and 85° angles of incidence. The minimum film formation temperatures (MFFT) were determined on an SS3000 MFFT bar. Data are presented in Table 8.2.

TABLE 8.2

Evaluation of gloss and MFFT

| Sample | Particle Size | MFFT of neat latex | Gloss (20°/60°/80°) |
|---|---|---|---|
| Comp. C | 67 | 1° C. | 110/90/95 |
| I1 | 168 | 0° C. | 74/80/95 |
| I2 | 249 | 8° C. | 48/67/95 |

Clear films made with latices of particle diameter greater than about 250 nm develop an unacceptable haze. This haze was measured as a loss of gloss at low angles of incidence. Also, the minimum film formation temperature of the neat latices increases with particle size; this increase may have detrimental effects on film formation.

EXAMPLE 9.

Preparation of waterborne polymeric compositions containing multi-stage polymers at various molecular weights Preparation of multi-staged emulsion-polymerized addition polymer for sample 13. A 4-neck, 5-liter, round-bottom stirred reaction flask containing 1085 g DI water and 1.33 g of a 58% ammonium alkylphenoxypolyethyleneoxy sulfate surfactant was heated to 85° C. To the kettle, 3 g sodium carbonate dissolved in 75 g DI water and 4 g ammonium persulfate dissolved in 20 g DI water were added in order. The batch temperature was adjusted to 85° C. after which a gradual addition of Stage #1 ME was initiated at a uniform rate and fed to completion to the kettle over 112 minutes. Simultaneously, the Cofeed Initiator was started at a rate of 5.7 g/10 minutes. The batch temperature was maintained at 85°±2° C. over the stage 1 feed period. On completion of the addition of Feed #1, the Cofeed Initiator feed was interrupted and the batch was held at 85°±2° C. for 30 minutes. After the hold period, the addition of the Stage #2 ME was started and the Cofeed Initiator addition was resumed. The Stage #2 ME was fed to the kettle over 68 minutes while maintaining a batch temperature of 85°±2° C. When all feeds were completed, the batch was held at temperature for 30 minutes. The reaction was then cooled to 65° C. Two redox chasers were added. The batch was neutralized with ammonia and a biocide was added. The Stage #1 ME consisted of an emulsion of 272.9 g DI water, 12.34 g of a 58% active solution of ammonium alkylphenoxypolyethyleneoxysulfate surfactant, 640.7 g butyl acrylate, 275.94 g methyl methacrylate, and 38.2 g methacrylic acid. The Stage #2 ME consisted of an emulsion of 272.9 g DI water, 7.57 g of ammonium alkylphenoxypolyethyleneoxy sulfate surfactant (58% active solution), 510.9 g methyl methacrylate, and 11.7 g methacrylic acid. The Cofeed Initiator was composed of 2 g ammonium persulfate dissolved in 100 g DI water. The product had a final weight % solids of 44.5, a pH+7.8, a viscosity of 43 cps, and a particle size of 147 nm (Brookhaven BI-90).

Preparation of multi-staged emulsion-polymerized addition polymer for sample 14. The method of preparation of multi-staged emulsion-polymerized addition polymer for sample 13 was repeated with one change: 2.4 g n-dodecyl mercaptan was added to the Stage #1 ME. This product had a weight % solids of 44.5, a pH=7.9, a viscosity of 62 cps, and a particle size of 138 nm (Brookhaven BI-90).

GPC weight average molecular weights of the soft, outer phase of the emulsion polymerized polymers described above were determined and are presented in Table 9.1

TABLE 9.I

Molecular weights of emulsion polymers

| Polymer for Sample | Particle Size (nm) | $M_w$ of Soft Phase ($\times 10^3$) |
|---|---|---|
| I3 | 147 | 210 |
| I4 | 138 | 160 |

The emulsion-polymerized addition polymers described above were mixed with the ingredients listed below in Table 9.2 added in the order shown.

TABLE 9.2

Composition of Samples 13-14.

| Sample I3 | Sample 14 |
|---|---|
| 200 g multi-stage emulsion | 200 g multi-stage emulsion |
| +13.3 g EKTASOLVE EB | +13.3 g EKTASOLVE EB |
| +4.4 g EKTASOLVE DB | +4.4 g EKTASOLVE DB |
| +9.0 g Water | +9.0 g Water |
| +0.27 g ACRYSOL RM-825 | +0.29 g ACRYSOL RM-825 |
| Final solids 39% | Final solids 39% |
| #2 Zahn Viscosity 20 seconds | #2 Zahn Viscosity 25 seconds |

EXAMPLE 10.

Evaluation of waterborne polymeric compositions containing multi-stage polymers at various molecular weights Spray-applied film properties; as represented by microfoam, gloss and distinctness of image; were evaluated by air-spraying one coat of each of Samples 13-14 onto black glass. The coats were applied using a conventional suction-feed spray gun (DeVilbiss MBC) with an EX tip and a #30. The gas pressure was 45 psi. The panels were sprayed and dried at 94° F./26%RH. To determine the amount of microfoam bubble density was evaluated using a 70X microscope and counting the number of bubbles per square mm in the final dried film. Gloss Readings were made with a Byk Labotron gloss unit at 20°, 60°, and 850° angles of incidence. Distinctness of image(DOI) readings were made using a Gardner DOI meter (Model #GB11-8GM) which uses a Landolt Ring film to quantify the DOI. DOI readings were made by placing the coated piece under the DOI meter and visually determining the smallest rings which could clearly be distinguished. The panel was approximately 9 mm below the light source. The results are given in Table 10.1.

TABLE 10.1

Evaluation of clear film properties.

| Sample | Gloss 20°/60°/85° | DOI | Bubbles/mm² |
|---|---|---|---|
| I3 | 58/74/84 | 25 | 184 |
| I4 | 73/77/89 | 60 | 80 |

By reducing the $M_w$ of the latex in Sample 14 of this invention there is a significant improvement in gloss, DOI, and a drop in bubble density relative to sample 13 of this invention.

EXAMPLE 11.

Preparation of waterborne polymeric composition containing emulsion-polymerized polymer admixed with smaller particle size emulsion-polymerized polymer Preparation of samples 15-16.

Preparation of the emulsion polymer blend for sample 16. A blend of the latex prepared for sample 6 (particle diameter, d=128 nm) and latex a (34nm) were used in sample 16.

Preparation of latex a. In a 5-gallon stirred reactor 7,250 g DI water and 300.8 g (28% active sodium lauryl sulfate) were heated to 85° C. A solution of 9.07 g sodium carbonate in 105.4 g DI water was charged to the reaction followed by the addition of 22.94 g ammonium persulfate dissolved in 126.5 g DI water. Two minutes later, a gradual addition of the monomer emulsion was begun at a feed rate of 53 g/10 minutes. After 20 minutes minutes, the feed rate was increased to 120 g/minute. A batch temperature of 85°±2° C. was maintained throughout a 105 minute gradual addition feed period. The monomer emulsion consisted of 4529.7 g DI water, 44.71 g (28% active sodium lauryl sulfate), 4469.3 g methyl methacrylate, 845.54 g isobutyl methacrylate, 483.2 g styrene, 241.6 g methacrylic acid. On completion of the monomer emulsion feed, the batch was held for 30 minutes at 85°±2° C. before cooling to 60° C. A redox chase was added and the batch was neutralized to pH=7.5 with aqueous ammonia. The final product had a weight % solids of 32.3 and a particle size of 34 nanometers.

The emulsion-polymerized addition polymers for samples 15 and 16 described above were mixed with the ingredients listed below added in the order shown.

| Sample 15 | Sample 16 |
|---|---|
| 150 g Emul. pol. for sample 6 | 150 g Emul. pol. fpr sample 6 |
| +11.6 g Ektasolve TM EB | +38 g Latex a |
| +3.9 g Ektasolve TM DB | +11.6 g Ektasolve TM EB |
| +20.8 g Water | +3.9 g Ektasolve TM DB |
| +2 g Acrysol TM RM-825 | +57.6 g Water |
| Final solids 32% | +2 g Acrysol TM RM-825 |
| #2 Zahn Viscosity 22 seconds | Final solids 27.7% |
| | #2 Zahn Cup Visc 22 sec |

EXAMPLE 12.

Evaluation of waterborne polymeric composition containing emulsion-polymerized polymer admixed with smaller particle size emulsion-polymerized polymer Spray properties were evaluated by spraying one coat of each of Samples 15-16 over a black glass substrate. The coats were applied using a conventional suction-feed spray gun (DeVilbiss MBC) with an EX tip and a #30. The gas pressure was 45 psi. The panels were sprayed and dried at 90° F./15%RH. The bubble density was evaluated using a 70X microscope and counting the number of bubbles per square mm in the final dried film. Gloss Readings were made with a Byk Labotron gloss unit at 20°,60° and 85° angles of incidence. Distinctness of image readings were made using a Gardner DOI meter (Model #GB11-8GM) which used a Landolt Ring film to quantify the DOI. DOI readings were made by placing the coated piece under the DOI meter and visually determining the smallest rings which could clearly be distinguished. The panel was approximately 9ram below the light source. The results are given below in Table 12.1.

TABLE 12.1

| | Evaluation of apray-applied clear films | | |
|---|---|---|---|
| Sample | Gloss 20°/60°/85° | DOI | Bubbles/mm$^2$ |
| 15 | 39/60/73 | 20 | 248 |
| 16 | 110/91/91 | 80 | 0 |

The admixture of the small particle emulsion polymer with the waterborne polymeric composition as exemplified in sample 16 of this invention causes a significant improvement in gloss, DOI, and a drop in bubble density relative to sample 15 of this invention.

EXAMPLE 13

Preparation of waterborne polymeric composition containing a multistaged emulsion-polymerized polymer admixed with smaller particle size emulsion-polymerized polymer Sample 17 contains the multi-staged emulsion-polymerized addition polymer prepared for sample 13 (particle diameter, d=147nm); whereas, Sample 18 contains the multi-staged emulsion-polymerized addition polymer prepared for sample 13 (particle diameter, d=147nm) and latex a (particle diameter, d=34nm)in the compositions presented in Table 13.1.

TABLE 13.1

| Composition of samples 17-18. | |
|---|---|
| Sample 17 | Sample 18 |
| 200 g emul. pol. for sample 13 | 66 g emul. pol. for sample 13 |
| +13.3 g Ektasolve TM EB | +9.15 g Latex a |
| +4.4 g Ektasolve TM DB | +4.39 g Ektasolve TM EB |
| +9.0 g Water | +1.45 g Ektasolve TM DB |
| +0.27 g Acrysol TM RM-825 | +2.97 g Water |
| Final solids 39% | 0.09 g Acrysol TM RM-825 |
| #2 Zahn Viscosity 20 seconds | Final solids 38% |
| | 18 sec #2 Zahn Cup Visc |

EXAMPLE 14

Preparation of waterborne polymeric composition containing a multistaged emulsion-polymerized polymer admixed with smaller particle size emulsion-polymerized polymer Spray-applied waterborne composition properties-microfoam, gloss and distinctness of image were evaluated by spraying one coat of each of samples 17-18 over a substrate. The coats were applied using a conventional suction-feed spray gun (DeVilbiss MBC) with an EX tip and a #30. The gas pressure was 45 psi. The panels were sprayed and dried at 94° F./26%RH. The bubble density was evaluated using a 70X microscope and counting the number of bubbles per square mm in the final dried film. Gloss Readings were made with a Byk Labotron gloss unit at 20°, 60°, and 85° angles of incidence. Distinctness of image readings were made using a Gardner DOI meter (Model #GB11-8GM) which used a Landolt Ring film to quantify the DOI. DOI readings were made by placing the coated piece under the DOI meter and visually determining the smallest rings which could clearly be distinguished. The panel was approximately 9 mm below the light source. The results are given below in Table 14.1.

TABLE I4.1

| | Evalation of spray-applied clear composition | | |
|---|---|---|---|
| Sample | Gloss 20°/60°/85° | DOI | Bubbles/mm$^2$ |
| 17 | 58/74/84 | 25 | 184 |
| 18 | 106/88/90 | 85 | 7 |

The admixture of the small particle emulsion polymer with the waterborne polymeric composition as exemplified in sample 18 of this invention causes a significant improvement in gloss, DOI, and a drop in bubble density relative to sample 17 of this invention.

What is claimed is:

1. A method for reducing the amount of microfoam in a spray-applied clear waterborne polymeric composition comprising:
   (a) forming said clear composition comprising an emulsion-polymerized addition polymer having a GPC weight average molecular weight of less than about 75,000;
   (b) applying said clear composition to a substrate using a spraying method; and
   (c) drying said clear composition.

2. The method of claim 1 wherein said emulsion-polymerized addition polymer has a GPC weight average molecular weight from about 10,000 to about 5,000.

3. The method of claim 1 wherein said emulsion-polymerized addition polymer has an average particle diameter from about 130 nanometers to about 250 nanometers.

4. The method of claim 1 or claim 3 wherein said clear composition further comprises from about 5% to about 50%, by dry weight based on dry weight of said emulsion-polymerized addition polymer, of an emulsion-polymerized polymer having an average particle diameter less than about 0.5 times the average particle diameter of said emulsion-polymerized addition polymer.

5. The method of claim 1 or claim 3 wherein said clear composition further comprises from about 10% to about 20%, by dry weight based on dry weight of said emulsion-polymerized addition polymer, of an emulsion-polymerized polymer having an average particle diameter less than about 0.5 times the average particle diameter of said emulsion-polymerized addition polymer.

6. A method for reducing the amount of microfoam in a spray-applied clear waterborne polymeric composition comprising:
   (a) forming said clear composition comprising multi-staged emulsion-polymerized addition polymer particles, said particles having an inner phase and an outer phase, wherein said outer phase has a GPC weight average molecular weight of less than about 200,000;
   (b) applying said clear composition to a substrate using a spraying method; and
   (c) drying said clear composition.

7. The method of claim 6 wherein said outer phase has a GPC weight average molecular weight from about 10,000 to about 200,000.

8. A method for reducing the amount of microfoam in a spray-applied clear waterborne polymeric composition comprising:
   (a) forming said clear composition comprising multi-staged emulsion-polymerized addition polymer particles, said particles having an average particle diameter from about 130 nanometers to about 250 nanometers.
   (b) applying said clear composition to a substrate using a spraying method; and
   (c) drying said clear composition.

9. The method of claim 7 wherein said particles have an average particle diameter from about 130 nanometers to about 250 nanometers.

10. The method of claim 6 or claim 8 wherein said clear composition further comprises from about 5% to about 50%, by dry weight based on dry weight of said multi-staged emulsion-polymerized addition polymer particles, of an emulsion-polymerized polymer having an average particle diameter less than about 0.5 times the diameter of said multi-staged emulsion-polymerized addition polymer particles.

11. The method of claim 6 or claim 8 wherein said clear composition further comprises from about 10% to about 20%, by dry weight based on dry weight of said multi-staged emulsion-polymerized addition polymer particles, of an emulsion-polymerized polymer having an average particle diameter less than about 0.5 times the diameter of said multi-staged emulsion-polymerized addition polymer particles.

12. A substrate bearing a spray-applied clear waterborne polymeric composition with reduced amount of microfoam, said clear composition comprising an emulsion-polymerized polymer having a GPC weight average molecular weight of less than about 75,000.

13. The substrate of claim 12 wherein said emulsion-polymerized polymer has an average particle size from about 130 nanometers to about 250 nanometers.

14. The substrate of claim 12 or claim 13 wherein said clear composition further comprises from about 5% to about 50%, by dry weight based on dry weight of said emulsion-polymerized addition polymer, of an emulsion-polymerized polymer having an average particle diameter less than about 0.5 times the average particle diameter of said emulsion-polymerized addition polymer.

15. A substrate bearing a spray-applied clear waterborne polymeric composition with reduced amount of microfoam, said clear composition comprising multi-staged emulsion-polymerized addition polymer particles, said particles having an inner phase and an outer phase, wherein said outer phase has a GPC weight average molecular weight of less than about 200,000.

16. A substrate bearing a spray-applied clear waterborne polymeric composition with reduced amount of microfoam, said clear composition comprising multi-staged emulsion-polymerized addition polymer particles, said particles having an average particle diameter from about 130 nanometers to about 250 nanometers.

17. The substrate of claim 15 or claim 16 wherein said clear composition further comprises from about 5% to about 50%, by dry weight based on dry weight of said multi-staged emulsion-polymerized addition polymer particles, of an emulsion-polymerized polymer having an average particle diameter less than about 0.5 times the diameter of said multi-staged emulsion-polymerized addition polymer particles.

* * * * *